(12) United States Patent
Jin et al.

(10) Patent No.: US 9,542,652 B2
(45) Date of Patent: Jan. 10, 2017

(54) POSTERIOR PROBABILITY PURSUIT FOR ENTITY DISAMBIGUATION

(71) Applicant: Microsoft Corporation, Redmond, WA (US)

(72) Inventors: Yuzhe Jin, Bellevue, WA (US); Emre Mehmet Kiciman, Seattle, WA (US); Kuansan Wang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 442 days.

(21) Appl. No.: 13/779,769

(22) Filed: Feb. 28, 2013

(65) Prior Publication Data

US 2014/0244550 A1 Aug. 28, 2014

(51) Int. Cl.
*G06F 15/18* (2006.01)
*G06N 7/00* (2006.01)
*G06N 99/00* (2010.01)
*G06F 17/30* (2006.01)

(52) U.S. Cl.
CPC ........... *G06N 7/005* (2013.01); *G06F 17/3069* (2013.01); *G06F 17/30684* (2013.01); *G06N 99/005* (2013.01)

(58) Field of Classification Search
None
See application file for complete search history.

(56) References Cited

U.S. PATENT DOCUMENTS

| 8,005,862 | B2 | 8/2011 | Zwol et al. | |
|---|---|---|---|---|
| 8,122,026 | B1* | 2/2012 | Laroco et al. | 707/737 |
| 2006/0224565 | A1 | 10/2006 | Garg et al. | |
| 2007/0203693 | A1* | 8/2007 | Estes | 704/9 |
| 2007/0233656 | A1* | 10/2007 | Bunescu et al. | 707/3 |
| 2008/0104056 | A1* | 5/2008 | Li et al. | 707/5 |
| 2010/0076972 | A1 | 3/2010 | Baron et al. | |

(Continued)

OTHER PUBLICATIONS

"Entity Disambiguation for Knowledge Base Population"; Dredze et al Proceedings of the 23rd International Conference on Computational Linguistics (Coling 2010), pp. 277-285, Beijing, Aug. 2010.*

(Continued)

*Primary Examiner* — Luis Sitiriche
(74) *Attorney, Agent, or Firm* — Alin Corie; Sandy Swain; Micky Minhas

(57) ABSTRACT

Various technologies described herein pertain to disambiguation of a mention of an ambiguous entity in a document. A set of candidate entities can be retrieved from an entity knowledge base based upon the mention of the ambiguous entity, where each of the candidate entities has a respective entity feature representation. Moreover, a document feature representation can be generated based upon features of the document and the respective entity feature representations of the candidate entities. A processor can be caused to select a subset of features from the document feature representation based upon a measure of how discriminative the features from the document feature representation are for disambiguating the mention of the ambiguous entity. A disambiguated result for the mention of the ambiguous entity can be determined based upon the subset of the features. The disambiguated result can be an unknown entity or one of the candidate entities.

20 Claims, 8 Drawing Sheets

(56) References Cited

U.S. PATENT DOCUMENTS

| | | | |
|---|---|---|---|
| 2010/0082615 A1* | 4/2010 | Clinchant et al. | 707/728 |
| 2010/0293195 A1* | 11/2010 | Houghton | 707/776 |
| 2011/0243386 A1* | 10/2011 | Sofka et al. | 382/103 |
| 2012/0323839 A1 | 12/2012 | Kiciman et al. | |

OTHER PUBLICATIONS

"Ontology-Driven Automatic Entity Disambiguation in Unstructured Text" Hassell et al Proceedings of ISWC-2006, LNCS.*

"Robust disambiguation of named entities in text" J. Hoffart, M.A. Yosef, I. Bordino, H. Fürstenau, M. Pinkal, M. Spaniol, B. Taneva, S. Thater, G. Weikum; Conference on Empirical Methods in Natural Language Processing, EMNLP 2011, Edinburgh, 2011, pp. 782-792.*

Sen, Prithviraj, "Collective Context-Aware Topic Models for Entity Disambiguation", Retrieved at <<http://www2012.wwwconference.org/proceedings/proceedings/p729.pdf>>, In the Proceedings of 21st International Conference on World Wide Web, Apr. 16-20, 2012, pp. 729-738.

Nadeau, et al., "A survey of named entity recognition and classification", Retrieved at <<http://nlp.cs.nyu.edu/sekine/papers/li07.pdf>>, In the Proceedings of Linguisticae Investigationes, Jan. 2007, pp. 1-20.

Cucerzan, Silviu, "Large-Scale Named Entity Disambiguation Based on Wikipedia Data", Retrieved at <<http://acl.ldc.upenn.edu/D/D07/D07-1074.pdf>>, In the Proceedings of Empirical Methods in Natural Language Processing and Computational Natural Language Learning, Jun. 28, 2007, pp. 708-716.

Han, et al., "Structural Semantic Relatedness: A Knowledge-Based Method to Named Entity Disambiguation", Retrieved at http://www.aclweb.org/anthology-new/P/P10/P10-1006.pdf>>, In the Proceedings of 48th Annual Meeting of the Association for Computational Linguistics, Jul. 11, 2010, pp. 50-59.

Bunescu, et al., "Using Encyclopedic Knowledge for Named Entity Disambiguation", Retrieved at <<http://www.aclweb.org/anthology-new/E/E06/E06-1002.pdf>>, In the proceedings of 11th Conference of the European Chapter of the Association for Computational Linguistics, Oct. 14, 2008, pp. 9-16.

Chen, et al., "Explore Person Specific Evidence in Web Person Name Disambiguation", Retrieved at <<http://www.aclweb.org/anthology-new/D/D12/D12-1076.pdf>>, In the proceedings of Empirical Methods in Natural Language Processing and Computational Natural Language Learning, Jul. 12, 2012, pp. 832-842.

* cited by examiner

POSTERIOR PROBABILITY PURSUIT FOR ENTITY DISAMBIGUATION

BACKGROUND

With the large (and ever-growing) amount of information available on the World Wide Web, it can be desirable to assign deep structure and understanding to otherwise unstructured documents (e.g., textual documents) by determining content of the documents based on existing knowledge bases. For instance, given a document and an entity knowledge base, it can be desired to determine which entity in the entity knowledge base is mentioned in the document, or alternatively indicate that no entity from the entity knowledge base is mentioned in the document. However, in a web-scale entity knowledge base, it is highly likely that different entities may share a common name. Thus, different entities may have the same surface form (e.g., mention), which can lead to an inherent ambiguity when attempting to resolve a mention of an ambiguous entity to a matching entry in the entity knowledge base. By way of illustration, the entity knowledge base can include more than one "Joe Smith" (e.g., a doctor, a football player, etc.); following this illustration, a mention of "Joe Smith" in a document can be ambiguous since such mention may refer to "Joe Smith" the doctor, "Joe Smith" the football player, etc. from the entity knowledge base or an unknown "Joe Smith" outside of the entity knowledge base.

To resolve a mention of an entity in a document using an entity knowledge base, conventional approaches commonly extract features from the document and compare those features to feature representations of the entities in the entity knowledge base. Traditional approaches for entity disambiguation oftentimes employ a type of similarity measure that evaluates a distance between a context of a mention in a document and a context of an entity in an entity knowledge base. Examples of conventional similarity measures include cosine (with term frequency-inverse document frequency (TF-IDF)), Kullback-Leibler (KL) divergence (with a language model), and Jaccard. Other conventional approaches have explored the co-occurrence of multiple entities and perform joint recognition.

However, conventional entity disambiguation approaches can be problematic. For instance, various conventional approaches can build feature vectors out of the mention and the candidate entities, and perform similarity comparisons among feature vectors. Yet, some features can be missing, and features from different facets of the entity can be missing for different occurrences of the mention. Accordingly, a fixed weight for each dimension of the feature vector can be learned, while many of the features can be language components such as "the", "and", "a", "an", etc., which may not be discriminative for entity disambiguation. According to another example, for many conventional approaches, the features are designed and engineered for a particular entity knowledge base. Accordingly, such approaches can lack scalability and extensibility when applied to different domains where the entity knowledge bases therein have different schema.

SUMMARY

Described herein are various technologies that pertain to disambiguation of a mention of an ambiguous entity in a document. The document that includes the mention of the ambiguous entity can be received. A set of candidate entities can be retrieved from an entity knowledge base based upon the mention of the ambiguous entity, where each of the candidate entities has a respective entity feature representation. Moreover, a document feature representation can be generated based upon features of the document and the respective entity feature representations of the candidate entities. A processor can be caused to select a subset of features from the document feature representation based upon a measure of how discriminative the features from the document feature representation are for disambiguating the mention of the ambiguous entity. A disambiguated result for the mention of the ambiguous entity can be determined based upon the subset of the features. The disambiguated result can be an unknown entity or one of the candidate entities.

According to various embodiments, a posterior probability pursuit algorithm can be employed to select the subset of the features from the document feature representation and determine the disambiguated result for the mention of the ambiguous entity based upon the subset of the features. According to an example, while conditions remain unsatisfied, an iterative technique can be employed. As part of such iterative technique, a feature from the document feature representation that maximizes a posterior probability can be identified, where the feature is identified from remaining features of the document feature representation (e.g., the remaining features are features not previously added to the subset of the features from the document feature representation as part of the iterative technique). Moreover, the feature can be added to the subset of the features from the document feature representation. The foregoing can be repeated so long as the conditions remain unsatisfied. Responsive to at least one of the conditions being satisfied, respective posterior probabilities for the candidate entities and the unknown entity can be computed based upon the subset of the features. Further, a disambiguated result for the mention of the ambiguous entity can be identified, where the disambiguated result corresponds to a maximum posterior probability from the respective posterior probabilities.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
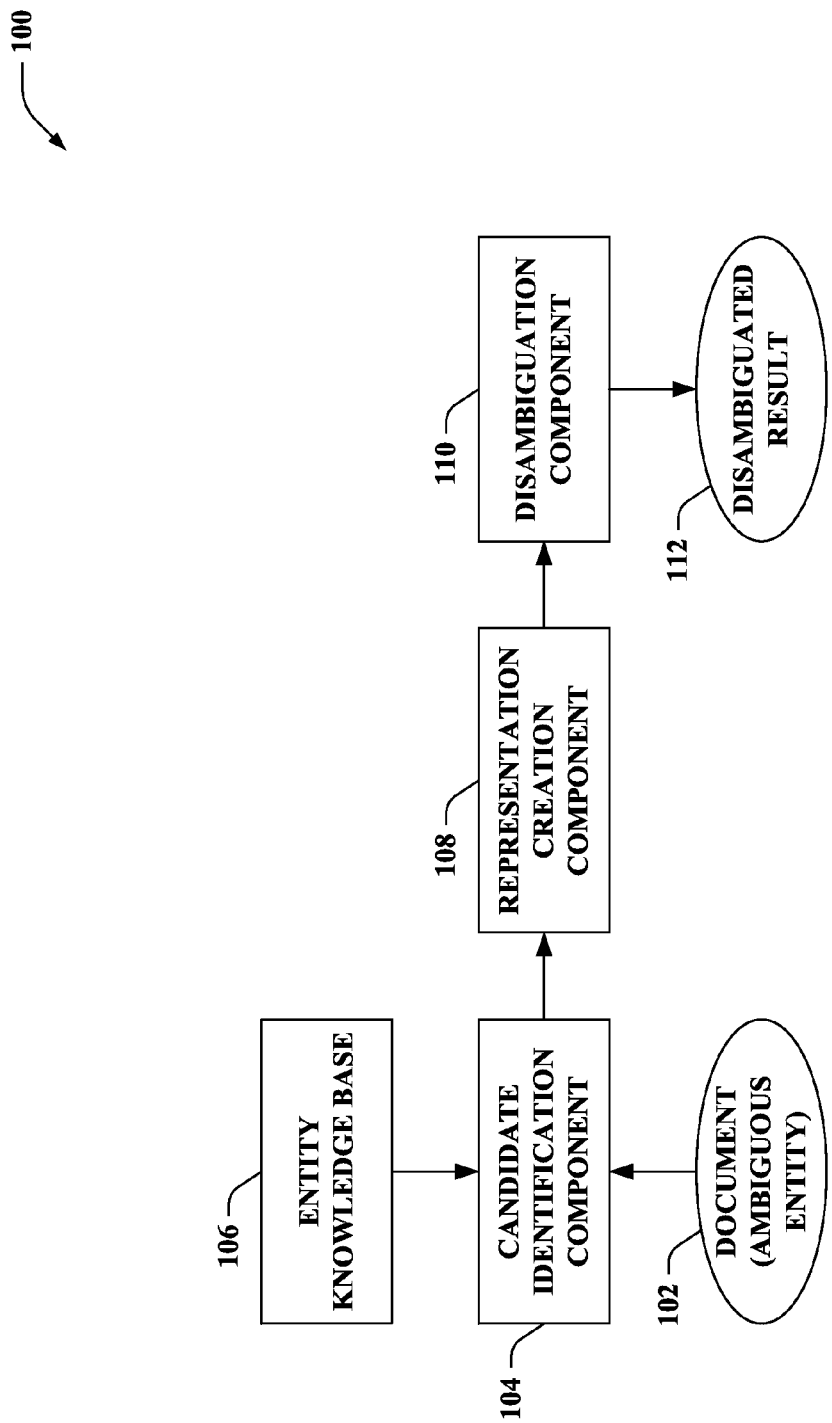
FIG. 1 illustrates a functional block diagram of an exemplary system that disambiguates a mention of an ambiguous entity included in a document.

Various technologies pertaining to disambiguating a mention of an ambiguous entity in a document using a posterior probability pursuit algorithm are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Set forth herein are various techniques associated with disambiguation of a mention of an ambiguous entity in a document. Given the document, which mentions the ambiguous entity, a corresponding entity from an entity knowledge base that matches the mention of the ambiguous entity can be determined, or it can be determined that there is no matching entity in the entity knowledge base (e.g., unknown entity). Unsupervised learning approaches that utilize features (e.g., lexical features), including words and phrases, in the document and the entity knowledge base can be employed for such disambiguation. More particularly, a sparse representation of the document can be found using elements in the entity knowledge base. By enforcing sparsity, a subset of discriminative features that can resolve the ambiguity about the entity in the document can be determined and employed to detect a disambiguated result.

Referring now to the drawings, FIG. 1 illustrates a system 100 that disambiguates a mention of an ambiguous entity included in a document 102. Through entity disambiguation, the system 100 can determine that the mention of the ambiguous entity pertains to a particular entity from an entity knowledge base 106 or an unknown entity (e.g., an entity outside of the entity knowledge base 106). The entity knowledge base 106 can be a structured entity knowledge base. Entities in the entity knowledge base 106 can have several attributes describing the entities. For each entity in the entity knowledge base 106, there can be several attributes describing the entity, where each attribute can have a value. Hence, for each entity in the entity knowledge base 106, there is a set of attribute-values that describe the particular entity.

The entity knowledge base 106 is a type of database for knowledge management. The entity knowledge base 106 can be an information repository that provides for information to be collected, organized, shared, searched, and utilized. The information included in the entity knowledge base 106 can pertain to entities. Examples of types of entities include people, places, things (e.g., movies, books, shows, etc.), and so forth.

The entity knowledge base 106 can include a set of entities $\epsilon$. For each entity $e \in E$, information can be represented in the form of attribute-value pairs. Let $a_e$ denote an attribute of e, and $v_e$ denote the corresponding value of attribute $a_e$. For example, for an entity e, $a_e$ may be the attribute "gender", and $v_e$ can be can be "male" as the value of the attribute. While many of the examples set forth herein describe the values being text-based, it is contemplated that the values can alternatively take on other forms, such as image, audio, or video. Moreover, using the aforementioned representation, an entity e in the entity knowledge base 106 can be characterized by $\{(a_e^{(k)}, v_e^{(k)})\}_{k=1}^{r}$, where r is the number of attribute-value pairs available for entity e.

For a given document D, (e.g., the document 102), it can be desired to determine an entity $e \in E$ so that D mentions e and its content. If no such entity exists in the entity knowledge base 106, it can be determined that D mentions an entity that is outside of $\epsilon$, which can be referred to as an unknown entity.

The system 100 includes a candidate identification component 104 that can receive the document 102 that includes the mention of the ambiguous entity. The candidate identification component 104 can identify a set of candidate entities from an entity knowledge base 106 from which to disambiguate the mention of the ambiguous entity. The candidate identification component 104 can further retrieve the set of the candidate entities from the entity knowledge base 106. Each of the candidate entities can have a respective entity feature representation. The candidate identification component 104, for instance, can retrieve the respective feature representations for the candidate entities. Further, the system 100 includes a representation creation component 108 that forms a document feature representation for the document 102 based upon features of the document 102 and the respective entity feature representations of the candidate entities.

Moreover, the system 100 includes a disambiguation component 110 that employs a posterior probability pursuit algorithm to select a subset of features from the document feature representation. The disambiguation component 110 can select the subset of the features from the document feature representation based upon how discriminative the features from the document feature representation are for disambiguating the mention of the ambiguous entity. The disambiguation component 110 can further employ the posterior probability pursuit algorithm to determine a disambiguated result 112 for the mention of the ambiguous entity in the document 102. Thus, the disambiguation component 110 can determine the disambiguated result 112 based upon the subset of the features, where the disambiguated result 112 is one of the candidate entities or an unknown entity.

The system 100 employs an unsupervised approach to disambiguate entities, which provides a scalable framework that can be utilized with Web-scale entity knowledge bases (e.g., the entity knowledge base 106). The system 100 can use lexical features, in the form of text, derived from contents of the document 102 and entities in the entity knowledge base 106. To take into account dependency among words, phrases in the entity knowledge base 106 can be extracted and fused with words to build entity feature representations for entities in the entity knowledge base 106. Given that the entity knowledge base 106 can include free-style text (and phrase boundaries may be unobvious or hidden), entity feature representations that include words and phrases can be built leveraging specific structures of the entity knowledge base 106 when available, and further by constructing a phrase language model that can segment text into phrases when no particular structure exists. In contrast, conventional approaches commonly encode text features in either a vector space representation (e.g., TF-IDF) or a unigram language model. Such conventional models can capture relative frequency of individual words, but may lose dependencies among words, resulting in spurious entity resolutions. Other traditional techniques incorporate higher order language models so that longer dependency can be modeled; yet, it can be difficult to build such higher order language models due to data sparsity, and the higher order language models tend to overgeneralize due to the artificial introduction of unseen n-grams that are used to build the language model.

The system 100 can resolve the ambiguous entity mentioned in the document 102 using the subset of features from the document feature representation, where the features in the subset are discriminative lexical features. This use of the discriminative lexical features can be rooted in the observation that in a textual content, many (or most) language units (e.g., words) serve syntactic purposes, whereas the remaining language units are related to the intention that an author attempts to convey. Meanwhile, the entity knowledge base 106 can include information about various aspects of an entity, whereas a portion of the aspects of such entity are typically mentioned in a single document (e.g., the document 102). By utilizing the features that carry discriminative information about the entity, the potential of deep understanding of the document 102 can be provided. To determine the discriminative features, the disambiguation component 110 can implement the posterior probability pursuit algorithm as set forth herein.

Figure 2:
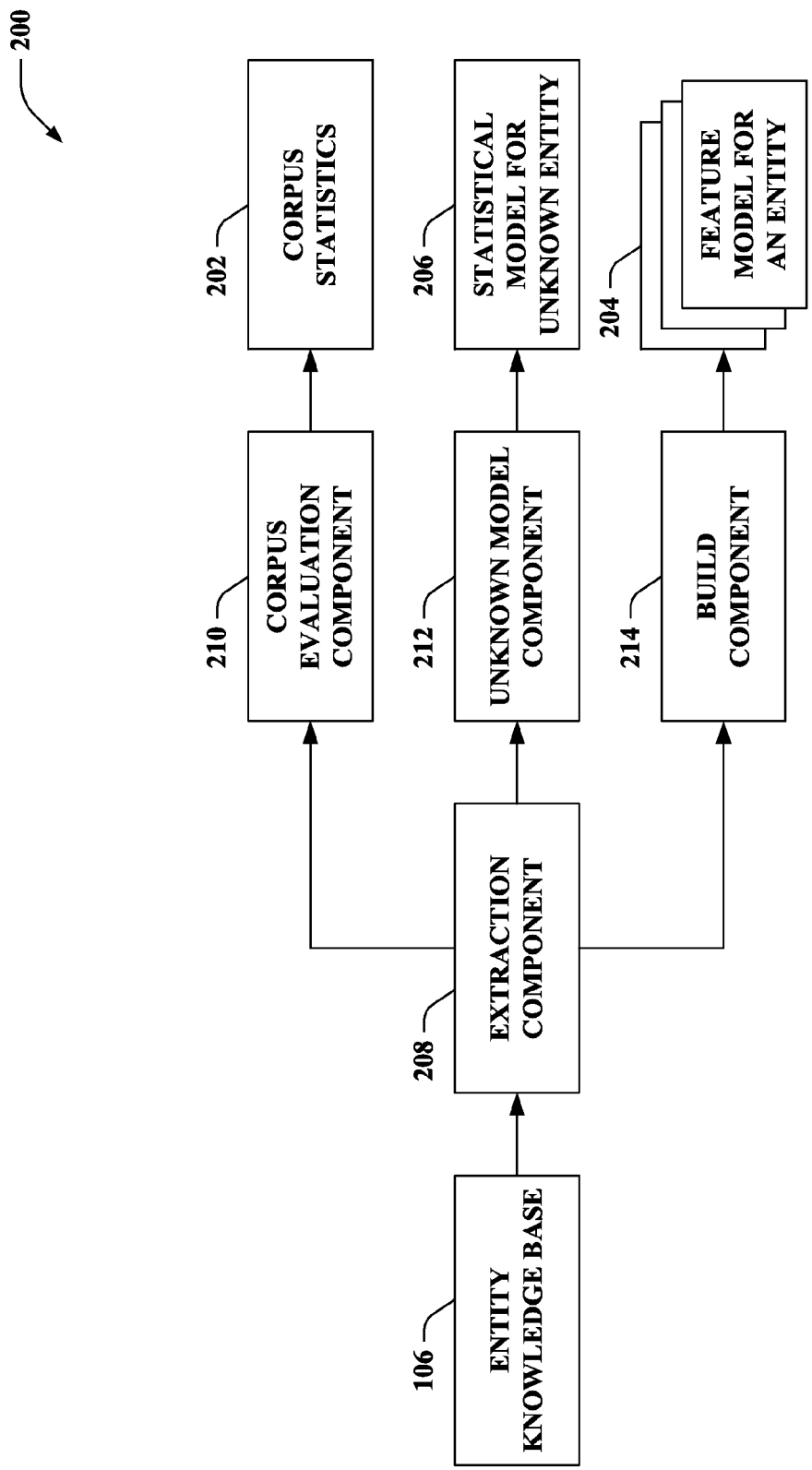
FIG. 2 illustrates a functional block diagram of an exemplary system that processes an entity knowledge base to obtain entity feature representations, statistics, and models.

With reference to FIG. 2, illustrated is a system 200 that processes the entity knowledge base 106 to obtain entity feature representations, statistics, and models. For instance, the system 200 can process the entity knowledge base 106 to generate entity feature representations of the entities in the entity knowledge base 106. Moreover, based upon the entity feature representations, the system 200 can compute corpus statistics 202 and train feature models for entities 204. The system 200 can further train a statistical model for an unknown entity 206 based upon the entity feature representations.

The system 200 includes an extraction component 208 that extracts features (e.g., values $v_e$'s) from the entity knowledge base 106 for each entity e in the entity knowledge base 106. Further, for the entity e, the extraction component 208 can form an entity feature representation based upon the extracted features of such entity. More particularly, for the value of each attribute, the extraction component 208 can treat a whole value as a feature; additionally, the extraction component 208 can separate the value into individual terms and each individual term can be treated as a feature. As an example, for the value "Stanford University", the extraction component 208 can extract "Stanford University", "Stanford", and "University"; following this example, the value "Stanford University" can contribute three features to the entity feature representation of the underlying entity. Using this approach, each entity e in the entity knowledge base 106 can be represented by a respective entity feature representation, which can be a respective set of features $F_e$.

As described herein, lexical features can be utilized to perform semantic entity resolution. The text-based values (e.g., the $v_e$'s) in the entity knowledge base 106 can serve as a source of potential lexical features. Traditionally, lexical features can be exploited using a bag of words model or a unigram language model. While such models can be effective in many tasks regarding information retrieval, higher order dependency among words are oftentimes ignored, and therefore lead to insufficiency in modeling entities.

To capture high order dependencies among words, a bag of words and phrases model, in which a lexical feature can be either a word or a phrase, where the latter can naturally preserve dependency across words, can be utilized. Unlike words, the phrase boundaries oftentimes are hidden, and therefore, use reconstruction to build such a model. Therefore, phrases can be systematically harvested from the text-based values of an entity by the extraction component 208. Various approaches to phrase discovery can be used by the extraction component 208.

According to an exemplary phrase discovery approach, the extraction component 208 can find phrases by relying on the observation that some attribute $a_e$ usually has a phrase as its value $v_e$ in the entity knowledge base 106. For example, attributes such as "university attended", "degree earned", "company", and "job title" in the entity knowledge base 106 (e.g., for a social network for people in professional occupations) typically have values that are by themselves phrases, e.g., "University of California, San Francisco", "Master of Science", "ABC, Inc.", and "Senior Hardware Engineer", respectively. In this case, the extraction component 208 can treat the value $v_e$ as a whole as a phrase. Further, the extraction component 208 can use such phrase to build the bag of words and phrases model (e.g., the entity feature representation) to characterize the underlying entity.

According to another exemplary phrase discovery approach, the extraction component 208 can extract phrases from values with free-style texts in the entity knowledge base 106. Examples of these types of text fields (e.g., in the entity knowledge base 106) include a main body of an entry in an entity knowledge base for a collaborative Internet encyclopedia, a detailed review of a restaurant in an entity knowledge base for a local directory service with social networking and user reviews, a summary of a person's professional experiences and qualifications in an entity knowledge base for a social network for people in professional occupations, and a biography of a movie director in an entity knowledge base for an online database of information related to films, television programs, and video games. Pursuant to this approach, the extraction component 208 can find phrases from the free-style texts by determining phrase boundaries. The phrase boundaries can be modeled as partially observed variables, where punctuation marks provide some boundaries of phrases, and the remainder of the boundaries are typically unknown (e.g., unobserved). For a given hypothesis of the phrase boundaries, a perplexity of a corpus can be computed using a suitable language model. The initial hypothesis can be iteratively refined until a reduction of the perplexity diminishes. The phrase boundaries in an updated hypothesis can be used to determine the phrases in each piece of free-style text.

The foregoing approach for phrase discovery, where phrases are extracted from values with free-style texts, may not determine relevance of a phrase to an underlying entity. Rather, phrase discovery can partition the free-style text into contiguous segments using a principled approach, and then treats each segment as a phrase. Although by construction, syntactic language blocks such as "in terms of", "he is a", and "has been doing" can be introduced in the model, importance of these noise like phrases can be properly discounted using corpus level statistics as described in greater detail below.

While the foregoing describes discovery of phrases from the text values of the entity knowledge base 106, words can be obtained by extracting each single word from the text values, or alternatively, from the phrases. The words and phrases include the lexical features for the entities in the entity knowledge base 106.

The system 200 further includes a corpus evaluation component 210 that learns the corpus statistics 202 from the features extracted from the entity knowledge base 106 by the extraction component 208. The corpus evaluation component 210 can, for each feature f in the entity knowledge base 106, compute a probability:

$$p(f)=C(f)/N$$

In the foregoing, C(f) is a number of entities that include f in its entity feature representation. For instance, $C(f)=|\{e: f \in F_e\}|$. Further, N is a total number of entities in the entity knowledge base 106. The probability p(f) can be a computed percentage of entities in the entity knowledge base 106 that include the feature f in respective entity feature representations. Thus, the corpus statistics 202 can include the relative frequencies of features being used across the corpus in the entity knowledge base 106.

Moreover, the system 200 includes an unknown model component 212 that trains the statistical model for the unknown entity 206 based upon a probability that the unknown entity includes a set of features in an entity feature representation of the unknown entity. As noted above, the statistical model for the unknown entity 206 can be employed by the disambiguation component 110 of FIG. 1 to select the subset of the features from the document feature representation and determine the disambiguated results for the mention of the ambiguous entity based upon the subset of the features.

The system 200 further includes a build component 214 that trains the respective feature models for entities 204 in the entity knowledge base 106. Accordingly, the disambiguation component 110 of FIG. 1 can employ at least a subset of the respective feature models 204 to select the subset of features from the document feature representation and determine the disambiguated result 112 for the mention of the ambiguous entity based upon the subset of the features. The build component 214 can train a particular feature model for a particular entity by computing a smoothed probability of the feature being in the entity feature representation of the particular entity for each feature in the entity feature representation for the particular entity. For instance, the smoothed probability can be computed by the build component 214 as a function of a maximum likelihood estimation, a feature frequency specified by a language model, and so forth.

An unknown entity represents an entity outside of the entity knowledge base 106, which can be denoted by Unk. Let $F_e$ denote the set of lexical features, including words and phrases, for entity e for an entity $e \in E$. The build component 214 can determine p (f|e), defined as a probability of seeing the feature f in the feature set $F_e$. The build component 214, for instance, can estimate p (f|e) by applying a maximum likelihood estimate, which can translate into a frequency of occurrence of f in $F_e$. Moreover, a smoothing technique can be applied by the build component 214 to enhance the estimation. For the unknown entity Unk, the following can be defined:

$$P(f|Unk) \triangleq |\{e: f \in F_e\}|/|E|$$

for $f \in U_{e \in E} F_e$, which means that the probability of encountering feature f for an unknown entity can be approximated by the probability of seeing f in the entity feature representation of a random entity from the entity knowledge base 106.

Thus, the unknown model component 212, for a given set of features $F=\{f_1, \ldots, f_n\}$, can compute the probability that a random entity happens to include the set of features in its entity feature representation (e.g., the statistical model for the unknown entity 206) as:

$$P(F|Unk) = \prod_{j=1}^{n} P(f_j)$$

Further, the build component 214 can build a feature model for an entity e, for each feature f in the entity feature representation $F_e$, by computing the probability p(f|e) as a smoothed probability of seeing f in the entity feature representation of e. Various smoothing techniques can lead to different calculations of p(f|e). By way of illustration, using the Jelinek-Mercer smoothing method can lead to:

$$p(f|e) = \lambda \frac{C_e(f)}{\sum_{f' \in F_e} C_e(f')} + (1-\lambda)p_{bg}(f)$$

In the foregoing, $C_e$ (f) denotes the count of the occurrences of the feature f in the entity e's knowledge base item, $p_{bg}$ (f) is the probability of seeing feature f which can be estimated from a background model, and $\lambda \in [0,1]$ is a free regularization parameter.

In the foregoing example, $$\frac{C_e(f)}{\sum_{f' \in F_e} C_e(f')}$$

is a maximum likelihood estimate. Moreover, $p_{bg}(f)$ can be a smoothing approach used by the build component 214; however, it is contemplated that other models can be employed. According to another example, the build component 214 can use a language model to recover a true frequency of a word being mentioned. Following this example, the probability p(f|e) can be a function of feature frequency specified by a language model.

It is contemplated that the system 200 can support when a discovered entity is added to the entity knowledge base 106. The entity knowledge base 106 can include the set of entities that have respective previously trained feature models (e.g., the feature models for the entities 204 trained by the build component 214). The entity knowledge base 106 can dynamically assimilate a discovered entity into the set of entities without the system 200 retraining the respective previously trained feature models. Rather, a feature model for the discovered entity can be trained by the build component 214.

Again, reference is made to FIG. 1. The candidate identification component 104 can compute a prior probability of an entity e. The prior probability of seeing the entity e in the document 102 can be denoted by p (e). For purposes of entity disambiguation, suppose the set of entities to disambiguate is $\{e_1, \ldots, e_m, \text{Unk}\}$. Note that the set of entities to disambiguate includes the candidate entities (e.g., identified by the candidate identification component 104) and the unknown entity. Hence, the set of prior probabilities $\{p(e_1), \ldots, p(e_m), p(\text{Unk})\}$ satisfies the following:

$$p(e_i) > 0, i \in \{1, \ldots, m\}, p(\text{Unk}) > 0, \text{and } \Sigma_{i=1}^m p(e_i) + p(\text{Unk}) = 1$$

Thus, the candidate identification component 104 can assign prior probabilities to each of the identified candidate entities. As noted above, the prior probabilities have a positivity constraint. Further, another constraint set forth above is that the sum of the prior probabilities equals 1.

Further, as described herein, the representation creation component 108 can generate the document feature representation based upon features of the document 102 and the respective entity feature representations of the candidate entities. Thus, for a document D, which includes a mention of the ambiguous entity to disambiguate, the set of candidate entities from which to disambiguate can be retrieved by the candidate identification component 104, and this set of candidate entities can be denoted by $\{e_1, \ldots, e_m, \text{Unk}\}$. The representation creation component 108 can form a union set of features F of the candidate entities (e.g., from the respective entity feature representations of the candidate entities), which can be represented as:

$$F = \bigcup_{i=1}^m F_{e_i}$$

From the foregoing, the representation creation component 108 can extract a feature set $F_D$ from the document D (e.g., the document feature representation) as:

$$F_D = \{f : f \in F \land f \in D\}$$

$F_D$ is the set of features that are features for the set of candidate entities and features found in the document 102. Accordingly, $F_D$ can be a set of features from which the disambiguation component 110 searches for discriminative features (e.g., most discriminative features).

As described herein, features from the entity feature representations include words and phrases. Thus, the features from the document feature representation generated by the representation creation component 108 include words and phrases. According to an example, the phrases can include a particular phrase that is divided into two or more separate words. Following this example, the words included in the document feature representation can include the two or more separate words.

Figure 3:
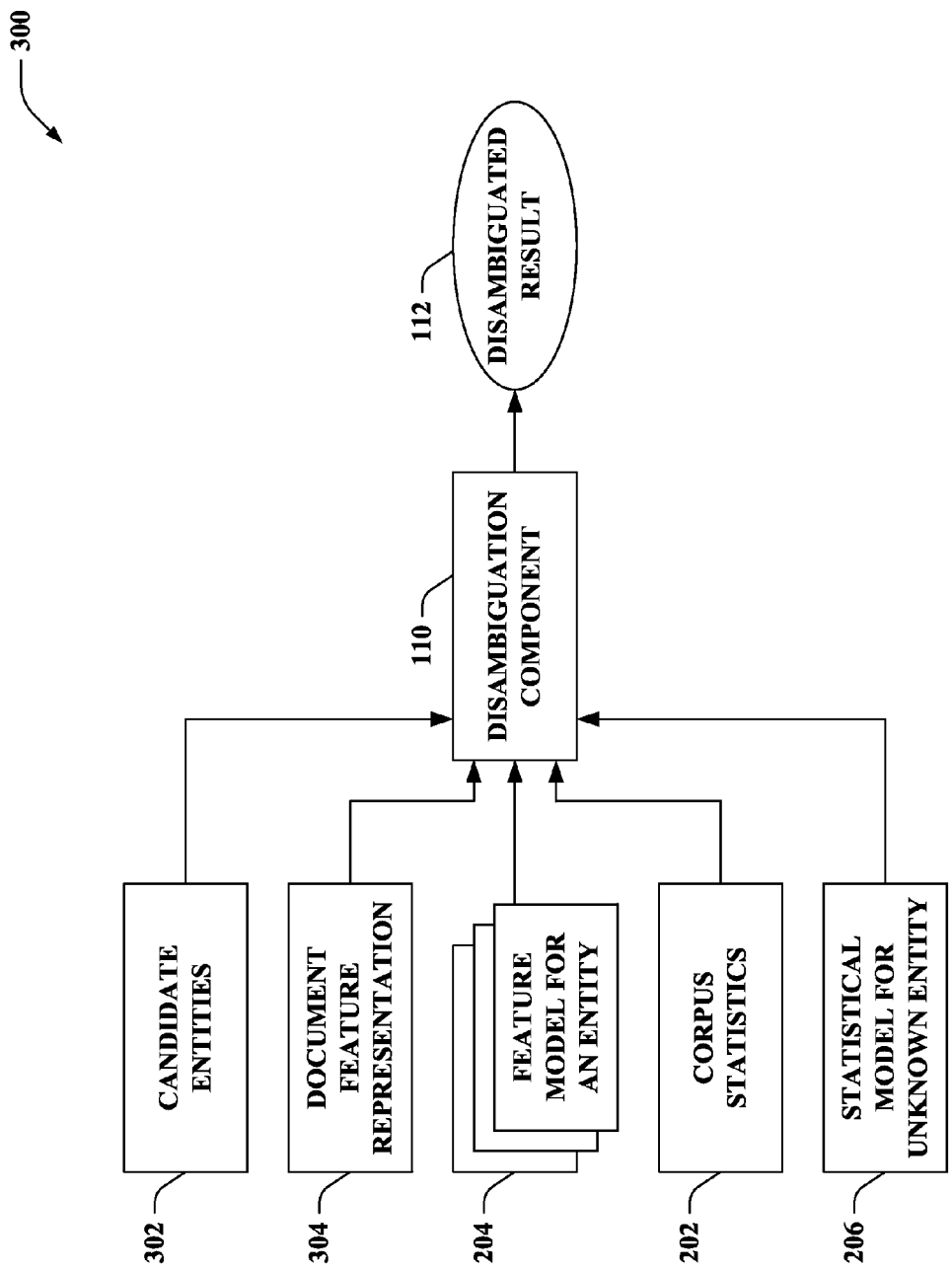
FIG. 3 illustrates a functional block diagram of an exemplary system that applies a posterior probability pursuit algorithm to disambiguate a mention of an ambiguous entity in a document.

Turning to FIG. 3, illustrated is a system 300 that applies a posterior probability pursuit algorithm to disambiguate a mention of an ambiguous entity in a document (e.g., the documents 102 of FIG. 1). The system 300 includes the disambiguation component 110, which can determine the disambiguated result 112. The disambiguation component 110, for instance, can disambiguate the mention of the ambiguous entity based upon the corpus statistics 202, the feature models for the entities 204, and the statistical model for the unknown entity 206. Moreover, the disambiguation component 110 can disambiguate the mention of the ambiguous entity based upon the candidate entities 302 and a document feature representation 304 (e.g., generated by the representation creation component 108 of FIG. 1).

The disambiguation component 110 can employ the posterior probability pursuit algorithm for entity disambiguation. Let $\{e_1, \ldots, e_m, \text{Unk}\}$ denote the set of entities to disambiguate (e.g., the candidate entities 302 and the unknown entity). Moreover, the posterior probability pursuit algorithm can proceed in an iterative manner as follows:

Step 0: Initialization. Let $G^{(0)} = \emptyset$. Let i = 1. Choose $M \in \mathbb{N}$ as a maximum number of iterations, and $\theta \in [0,1]$ as a threshold.
Step 1: At the i-th iteration, find:
  $f^{(i)} = \arg\max_{f \in F \setminus G^{(i-1)}} [\max_{j \in \{1,\ldots,m\}} p(e_j | G^{(i-1)} \cup \{f\})]$
  Let $G^{(i)} = G^{(i-1)} \cup \{f^{(i)}\}$, and $i \leftarrow i + 1$
Step 2: If any of the following conditions is satisfied, go to step 3; otherwise,
go to step 1:
  1) $\max_{j \in \{1,\ldots,m\}} p(e_j | G^{(i)}) > \theta$
  2) i = M
  3) $F \setminus G^{(i)} = \emptyset$
Step 3: Let $e^* = \arg\max_{e \in \{e_1,\ldots,e_m,\text{Unk}\}} p(e | G^{(i)})$. Output $e^*$ as the disambiguated result 112.

In the foregoing algorithm, at step 0, the disambiguation component 110 can initialize $G^{(0)}$ as the empty set. G can collect the subset of features in an iterative approach. The algorithm can cause the subset G to increase by one feature per iteration. Accordingly, the subset G can include the most discriminative features, which can be used for subsequent entity disambiguation. Moreover, M is a maximum number of iterations and $\theta$, which can be from 0 to 1, is the threshold.

At step 1, the disambiguation component 110 can compute $f^{(i)}$, which is a feature and entity that lead to a maximized posterior probability. Moreover, the disambiguation component 110 can generate $G^{(i)}$ as a union that adds the newly selected feature to the subset G. Accordingly, the disambiguation component 110 can select the subset of features from the document feature representation 304 based upon a measure of how discriminative the features from the document feature representation 304 are for disambiguating the mention of the ambiguous entity in the document. More particularly, the disambiguation component 110 can identify a feature from the document feature representation 304 that maximizes a posterior probability. The feature can be identified from remaining features of the document feature representation 304 (e.g., features not previously selected for inclusion in the subset of the features from the document feature representation 304). Moreover, the disambiguation component 110 can add the feature to the subset of the features from the document feature representation. The disambiguation component 110 can iteratively identify the feature and add that feature to the subset of the features while conditions remain unsatisfied (step 2).

At step 2, the disambiguation component 110 can evaluate various conditions to check whether to terminate the iteration. Condition 1 indicates that the posterior probability exceeds the threshold. In such case, the iterative algorithm can be terminated due to a sufficient level of confidence associated with the posterior probability exceeding the threshold value $\theta$. Condition 2 can indicate that the maximum number of iterations has been reached. Condition 3 pertains to the document feature representation 304 lacking remaining features. Accordingly, if no features remain, the algorithm can be terminated. If one of the foregoing conditions is satisfied, then the algorithm can continue to step 3; alternatively, if the conditions remain unsatisfied, then the algorithm returns to step 1. Thus, responsive to at least one of the conditions being satisfied, the disambiguation component 110 can determine the disambiguated result 112 for the mention of the ambiguous entity based upon the subset of the features. According to an example, the conditions can include that the posterior probability exceeds a threshold, a maximum number of iterations has been reached, and the document feature representation 304 lacks remaining features; yet, it is to be appreciated that a subset of the foregoing conditions and/or other condition(s) can be employed.

At step 3, the subset of features G can be utilized to compute a maximum posterior probability. The entity that provides the maximum posterior probability can be set as the disambiguated result 112 by the disambiguation component 110. Accordingly, the disambiguation component 110 can determine the disambiguated result 112 for the mention of the ambiguous entity based upon the subset of the features. As noted above, the disambiguated result 112 can be the unknown entity or one of the candidate entities (e.g., as determined by the candidate identification component 104). The disambiguation component 110 can compute, based upon the subset of the features, respective posterior probabilities for the candidate entities and the unknown entity. Further, the disambiguation component 110 can identify the disambiguated result 112, where the disambiguated result 112 corresponds to a maximum posterior probability from the respective posterior probabilities.

In step 1 above, the posterior probability can be calculated using Bayes rule as follows:

$$p(e_j|G) = \frac{p(G|e_j)p(e_j)}{\sum_{j' \in I} p(G|e_{j'})p(e_{j'}) + p(G|Unk)p(Unk)}$$

Moreover, $p(G|e_j)$ can be computed based on the entity's item in the entity knowledge base 106. For example, using the assumption of conditional independence, $p(G|e)=\Pi_{g \in G} p(g|e)$ can be obtained.

According to an example, it is contemplated that the disambiguation component 110 can further employ post-processing to filter a result. For example, if $p(e^*|G^{(i)}) < \theta$, then the disambiguated result 112 can indicate that the mention of the ambiguous entity pertains to the unknown entity; however, the claimed subject matter is not so limited.

The posterior probability pursuit algorithm implemented by the disambiguation component 110 can greedily increase the posterior probability of an entity by sequentially selecting lexical features. In step 1 of each iteration, a most discriminative yet unselected lexical feature can be found to maximally increase the posterior probability, which measures an agreement between an entity and the features selected from the document thus far. By enforcing an early termination, the posterior probability pursuit algorithm can encourage a small amount of highly discriminative features to be used in resolving entities, thus, being in line with a sparse nature underlying such task.

According to an example, the posterior probability pursuit algorithm can be interpreted as combining a naïve Bayes classifier with a matching pursuit principle. From a Bayesian viewpoint, the posterior probability pursuit can use a subset of features with a highly discriminative power, which can be determined ad hoc for a given document. This can be different from conventional naïve Bayes classifiers, which base decisions on all features. Moreover, under a sparse signal recovery perspective, a matching pursuit algorithm can be equipped with the posterior probability as the metric of fitting quality, which can potentially be more suitable for semantic processing tasks.

For the posterior probability pursuit algorithm, the parameters M and θ can control the termination criteria. θ can have a value between 0 and 1. When θ is set closer to one, the stopping criterion can be more stringent and lead to more lexical features, which can possibly increase the posterior probability beyond θ. Yet, it is contemplated that doing so can reduce a rate of falsely claiming a matching entity at the expense of missing out entities that are actually mentioned in the document (e.g., the document 102). Further, the parameter M can be a predefined threshold indicating a maximum number of iterations. For instance, M can be an integer from 20 to 30; however, it is contemplated that M can be an integer less than 20 or an integer greater than 30.

As described herein, semantic entity resolution (e.g., determination of the disambiguated result 112 from the mention of the ambiguous entity in the document 102 of FIG. 1) can be evaluated as a sparse signal recovery problem. In the areas pertaining to Web information processing, the term sparsity can be associated with the fact that a high dimensional vector representation can include many zero entries due to a contrast between a small amount of observed data (e.g., non-zero entries) and a large ambient dimension. For semantic entity resolution, however, additional forms of sparsity can be observed.

For instance, a form of sparsity associated with semantic entity resolution can stem from the comparison between a small amount of most discriminative lexical features for resolving an entity mentioned and a larger amount of words in the text. Typically, a significant portion of the lexical components in a Web document can serve as syntactic building blocks, which can be irrelevant to entities. The lexical features that can help distinguish the entity can be surrounded by the syntactic components. Therefore, rather than considering all lexical components available in the text, the approaches set forth herein can instead focus on a small amount of lexical features whose joint presence can suffice to resolve the ambiguity regarding the entity.

A second form of sparsity associated with semantic entity resolution can originate from an observation that, although the entity knowledge base 106 can provide a comprehensive coverage of the information pertaining to an entity, a Web document may mention a subset of the attributes of the entity. For example, a news article reporting an author and her book can mainly focus on her scholarly research related to her publication. Personal information such as date of birth, geographic residence, e-mail address, and past employers (which may exist in the entity knowledge base 106) however can be unlikely to be mentioned. Such observation can unveil the sparsity nature in terms of a small number of attributes mentioned in the document 102 versus a large number of potential attributes for the entity available in the entity knowledge base 106.

Figure 4:
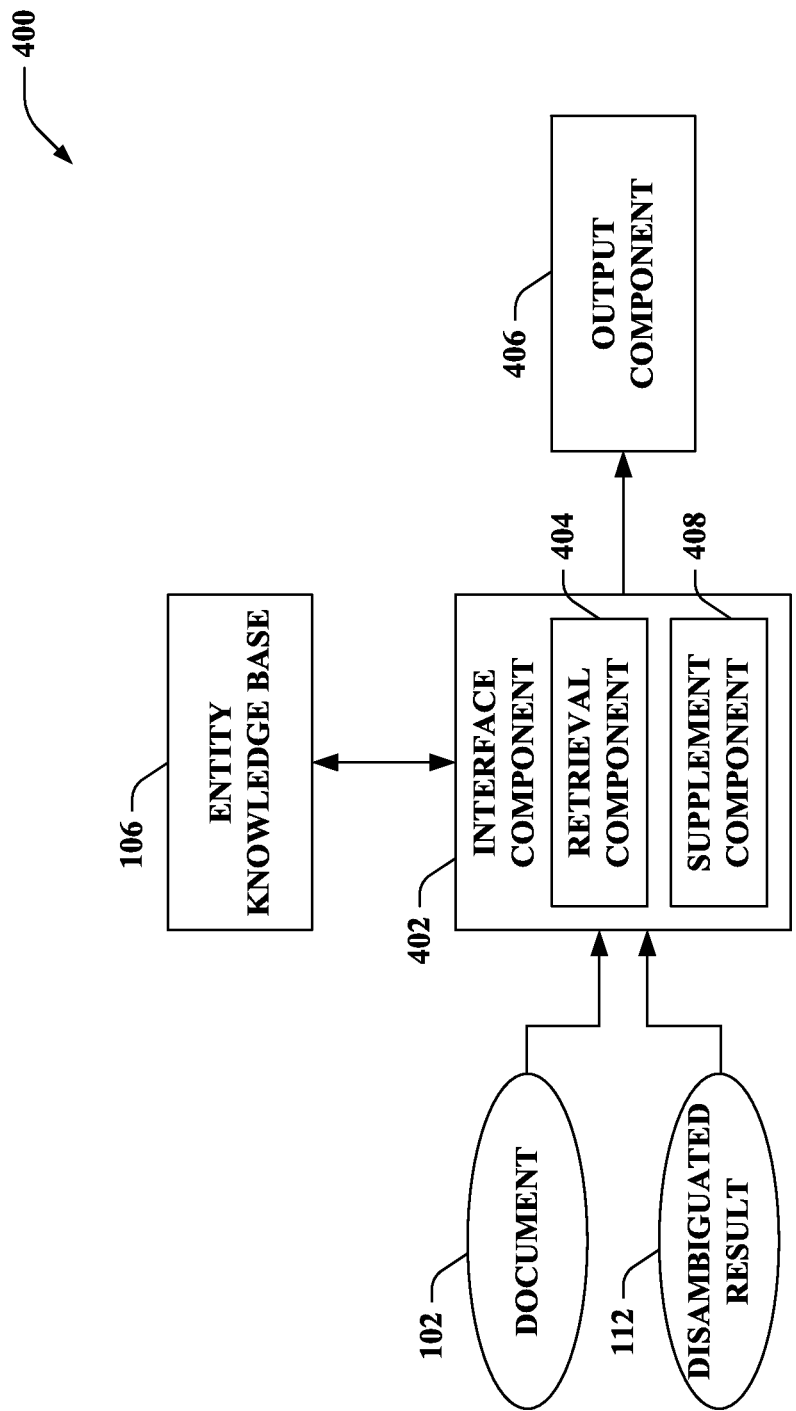
FIG. 4 illustrates a functional block diagram of an exemplary system that uses a disambiguated result for various user experience and data mining applications.

Turning to FIG. 4, illustrated is a system 400 that uses the disambiguated result 112 for various user experience and data mining applications. The system 400 includes an interface component 402, which can receive the document 102 and the disambiguated result 112. The interface component 402 can further include a retrieval component 404. Based upon the disambiguated result 112 (e.g., as determined by the disambiguation component 110), the retrieval component 404 can retrieve information from the entity knowledge base 106 related to the disambiguated result 112. The system 400 further includes an output component 406 that can output the information from the entity knowledge base 106 related to the disambiguated result 112. Examples of types of output that can be provided by the output component 406 include displaying the information on a display screen of a computing device, printing the information, sending the information to a disparate device (not shown), or substantially any other type of output. Accordingly, the retrieval component 404 (and the output component 406) can enable users to explore background information pertaining to the disambiguated result 112 from the entity knowledge base 106.

Additionally or alternatively, the interface component 402 can include a supplement component 408 that can augment the entity knowledge base 106 with information related to the disambiguated result 112. The information that augments the entity knowledge base 106 can be from the document 102. According to an illustration, the supplement component 408 can enhance the information included in the entity knowledge base 106 for the disambiguated result 112 with information from the document 102. The supplement component 408, for instance, can be utilized as part of a data mining technique, which can use unstructured documents to learn information to augment the entity knowledge base 106.

Figure 5:
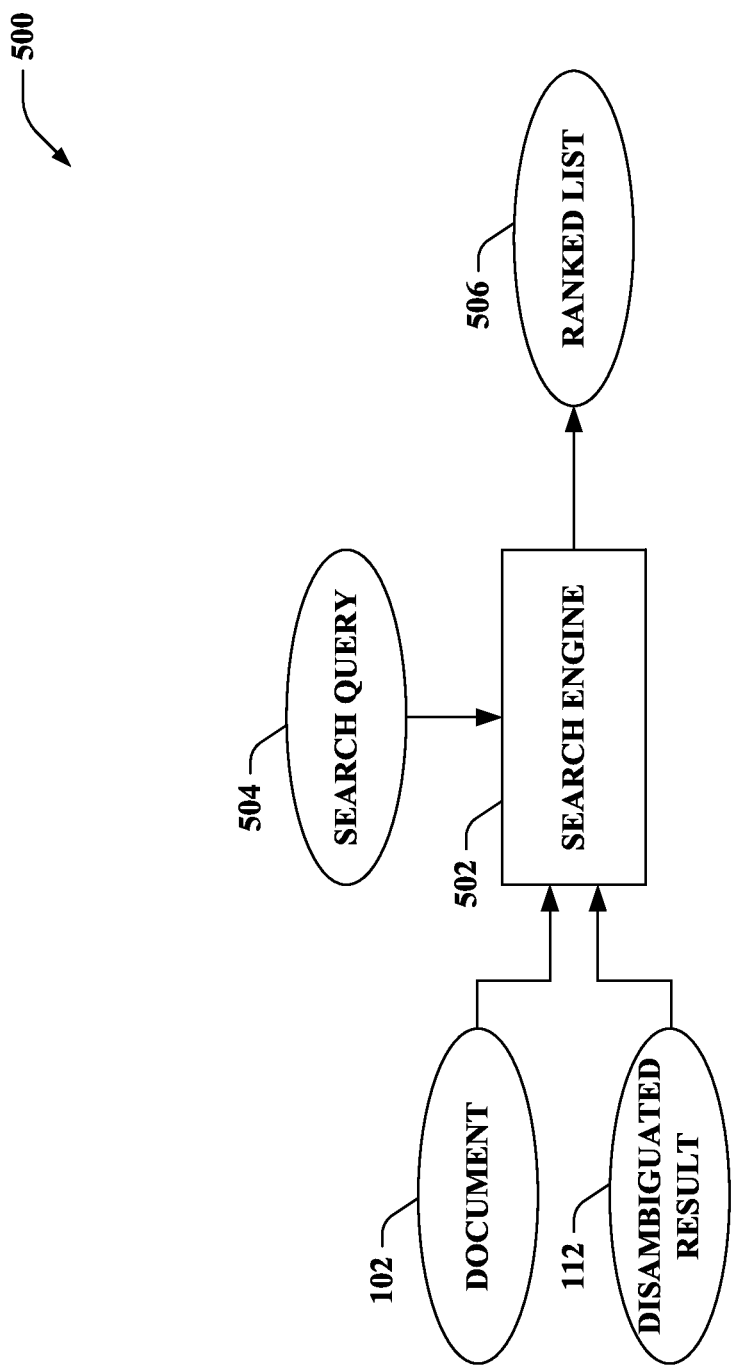
FIG. 5 illustrates a functional block diagram of an exemplary system that matches documents to queries and/or organizes search results based upon disambiguated results.

Turning to FIG. 5, illustrated is a system 500 that matches documents to queries and/or organizes search results based upon disambiguated results. The system 500 includes a search engine 502 that can receive a search query 504. Further, the search engine 502 can execute the search query 504 and return a ranked list 506 responsive to execution of the search query 504. The search engine 502 can position the document 102 in the ranked list 506 as a function of the disambiguated result 112.

According to an example, the document 102 can include a mention of "Michael Johnson." Through entity disambiguation as set forth herein, the disambiguated result 112 can indicate that the mention of "Michael Johnson" pertains to an architect in Santa Fe named "Michael Johnson." Thus, if the search query 504 is for "Santa Fe architect", then the search engine 502 can match the document 102 to the search query 504, causing the document 102 to be positioned higher in the ranked list 506. However, the claimed subject matter is not limited to the foregoing example.

Figure 6:
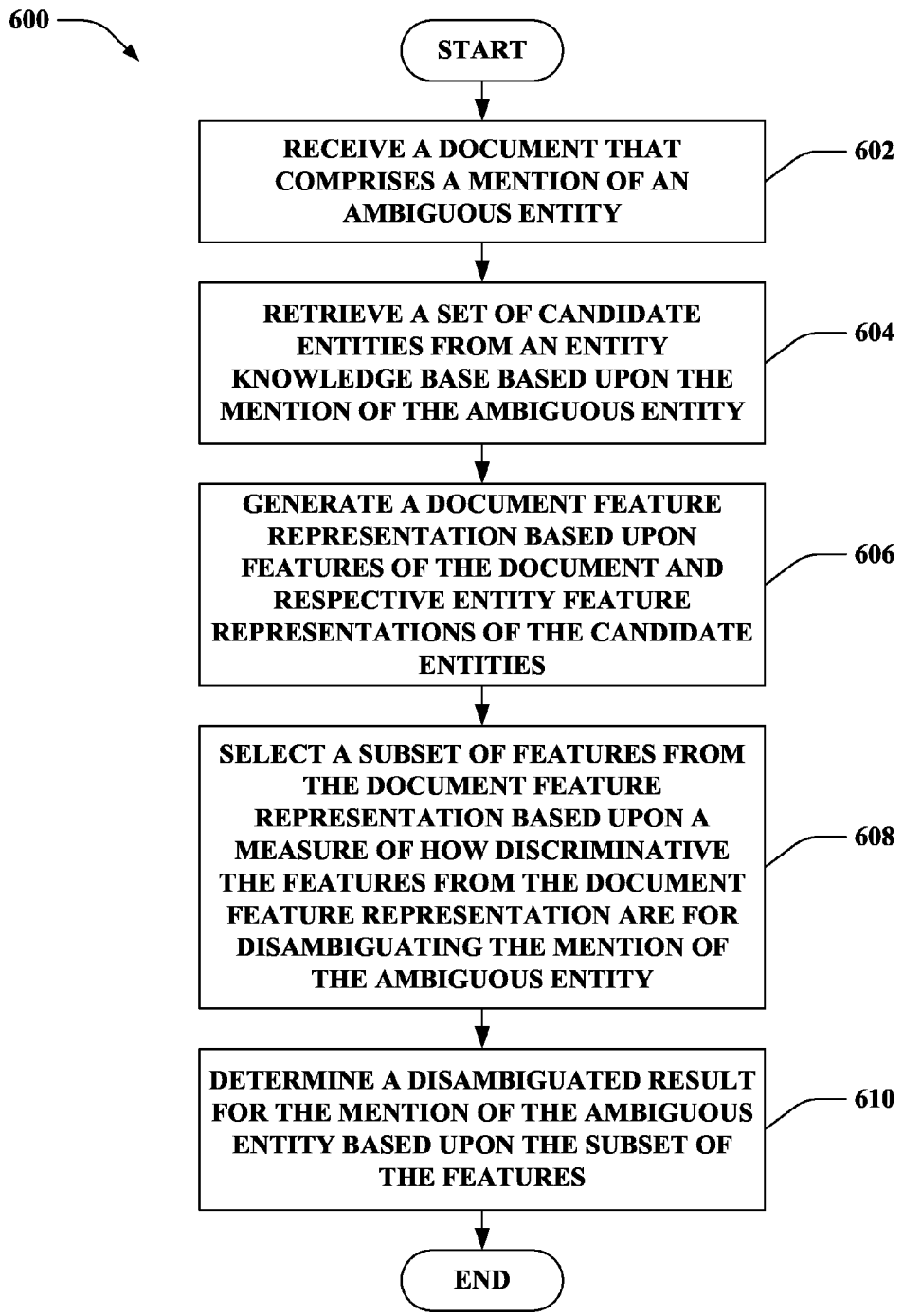
FIG. 6 is a flow diagram that illustrates an exemplary methodology of disambiguating a mention of an ambiguous entity.
Figure 7:
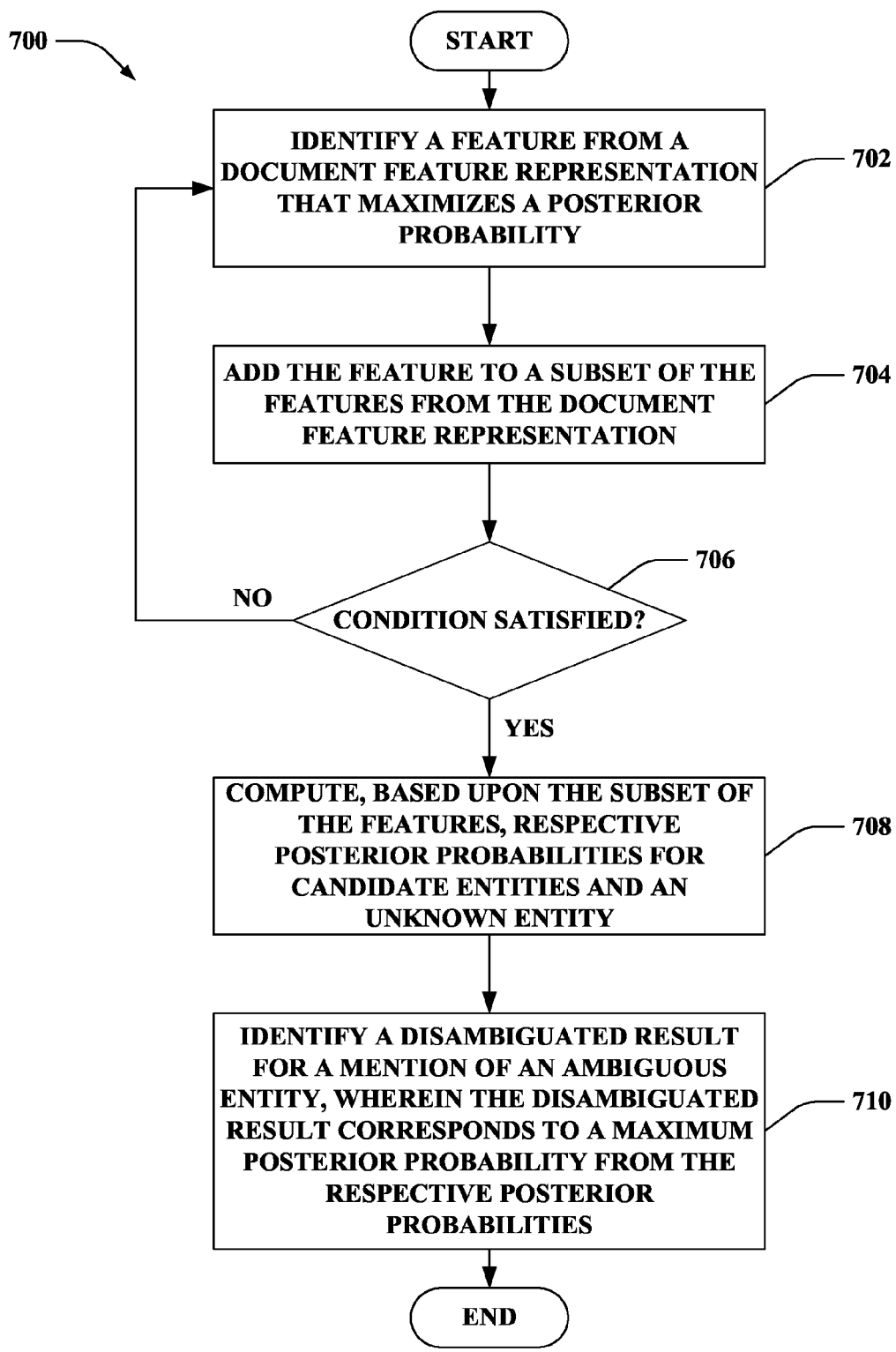
FIG. 7 is a flow diagram that illustrates an exemplary methodology of employing a posterior probability pursuit algorithm for entity disambiguation.

FIGS. 6-7 illustrate exemplary methodologies relating to entity disambiguation utilizing a posterior probability pursuit algorithm. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 6 illustrates a methodology 600 of disambiguating a mention of an ambiguous entity. At 602, a document that comprises the mention of the ambiguous entity can be received. At 604, a set of candidate entities can be retrieved from an entity knowledge base based upon the mention of the ambiguous entity. Each of the candidate entities can have a respective entity feature representation. At 606, a document feature representation can be generated based upon features of the document and respective entity feature representations of the candidate entities. At 608, a subset of features from the document feature representation can be selected based upon a measure of how discriminative the features from the document feature representation are for disambiguating the mention of the ambiguous entity. At 610, a disambiguated result for the mention of the ambiguous entity can be determined based upon the subset of the features. The disambiguated result can be an unknown entity or one of the candidate entities.

Turning to FIG. 7, illustrated is a methodology 700 of employing a posterior probability pursuit algorithm for entity disambiguation. The methodology 700 can be executed to select a subset of features from a document feature representation and determine a disambiguated result for a mention of an ambiguous entity in a document based upon the subset of the features. At 702, a feature from the document feature representation that maximizes a posterior probability can be identified. The feature can be identified from remaining features of the document feature representation. At 704, the feature can be added to the subset of the features from the document feature representation. At 706, conditions can be evaluated. The conditions can include, for example, whether the posterior probability exceeds a threshold, whether a maximum number of iterations has been reached, and whether the document feature representation lacks remaining features. If none of the conditions are determined to be satisfied at 706, then the methodology 700 can return to 702.

Alternatively, if at least one of the conditions evaluated at 706 are determined to be satisfied, then the methodology 700 can continue to 708. At 708, based upon the subset of the features, respective posterior probabilities for candidate entities and an unknown entity can be computed. At 710, a disambiguated result for a mention of an ambiguous entity can be identified. The disambiguated result can correspond to a maximum posterior probability from the respective posterior probabilities.

Figure 8:
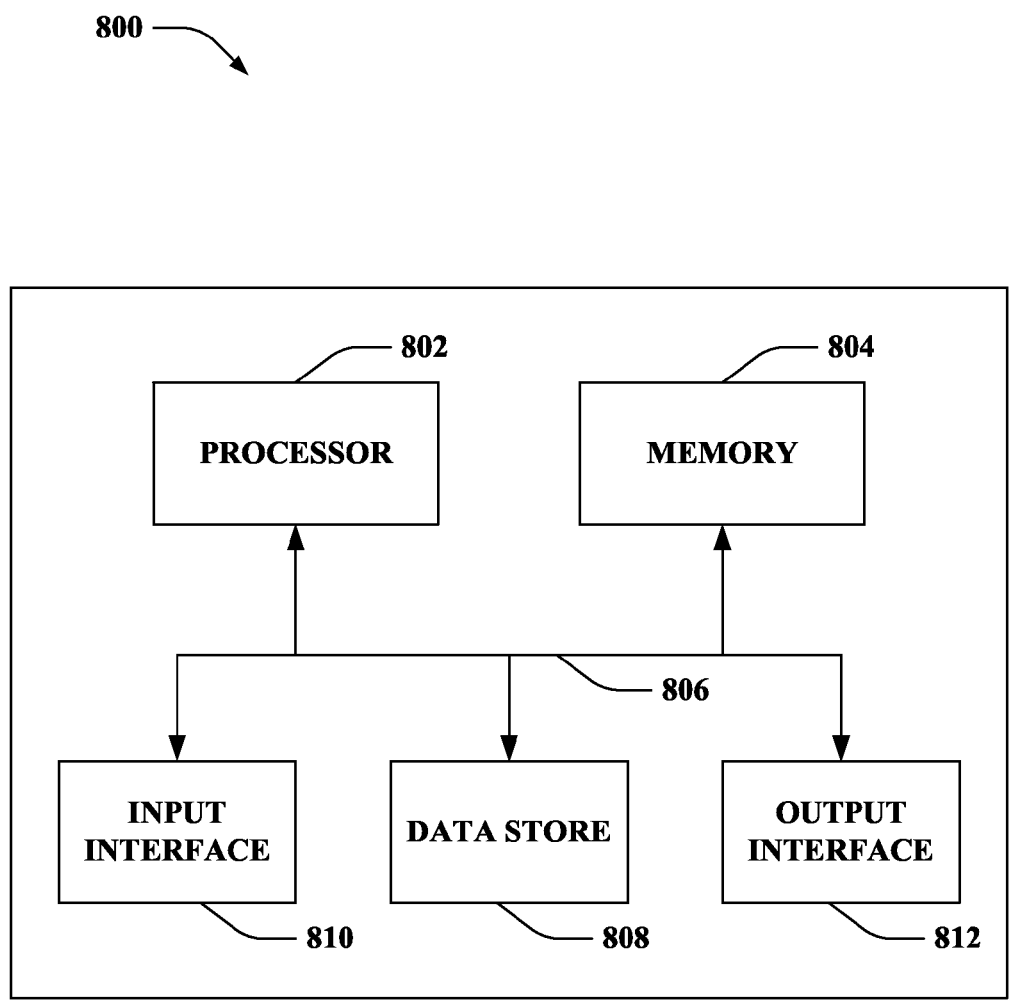
FIG. 8 illustrates an exemplary computing device.

Referring now to FIG. 8, a high-level illustration of an exemplary computing device 800 that can be used in accordance with the systems and methodologies disclosed herein is illustrated. For instance, the computing device 800 may be used in a system that disambiguates a mention of an ambiguous entity. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store document(s), candidate entities, entity feature representations, document feature representations, feature models, corpus statistics, statistical models for unknown entities, disambiguated results, and so forth.

The computing device 800 additionally includes a data store 808 that is accessible by the processor 802 by way of the system bus 806. The data store 808 may include executable instructions, a canvas, visual object(s) that fill the canvas, parameters, electronic documents, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

According to an example, the computing device 800 can transmit data to and/or receive data from an entity knowledge base (e.g., the entity knowledge base 106). Additionally or alternatively, the computing device 800 can include at least a portion of the entity knowledge base (e.g., retained in the memory 804 and/or the data store 808).

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of disambiguating a mention of an ambiguous entity, comprising:
   receiving a document that comprises the mention of the ambiguous entity;
   retrieving a set of candidate entities from an entity knowledge base based upon the mention of the ambiguous entity, wherein each of the candidate entities has a respective entity feature representation;
   generating a document feature representation based upon features of the document and the respective entity feature representations of the candidate entities, the document feature representation being generated to comprise features that are part of both:
     the features of the document; and
     a union set of features from the entity feature representations of the candidate entities;
   causing a processor to select a subset of the features from the document feature representation based upon a measure of how discriminative the features from the document feature representation are for disambiguating the mention of the ambiguous entity; and
   determining a disambiguated result for the mention of the ambiguous entity based upon the subset of the features by employing a posterior probability pursuit algorithm, wherein the disambiguated result is one of:
     an unknown entity; or
     one of the candidate entities.

2. The method of claim 1, wherein selecting the subset of the features from the document feature representation further comprises:
identifying a feature from the document feature representation that maximizes a posterior probability, wherein the feature is identified from remaining features of the document feature representation; and
adding the feature to the subset of the features from the document feature representation.

3. The method of claim 2, further comprising:
iteratively identifying the feature and adding the feature to the subset of the features while conditions remain unsatisfied; and
responsive to at least one of the conditions being satisfied, determining the disambiguated result for the mention of the ambiguous entity based upon the subset of the features.

4. The method of claim 3, wherein the conditions comprise:
the posterior probability exceeds a threshold;
a maximum number of iterations has been reached; and
the document feature representation lacks remaining features.

5. The method of claim 1, wherein determining the disambiguated result for the mention of the ambiguous entity based upon the subset of the features by employing the posterior probability pursuit algorithm further comprises:
computing, based upon the subset of the features, respective posterior probabilities for the candidate entities and the unknown entity; and
identifying the disambiguated result, wherein the disambiguated result corresponds to a maximum posterior probability from the respective posterior probabilities.

6. The method of claim 1, wherein the features from the document feature representation comprise words and phrases, wherein the phrases comprise a particular phrase that is divided into two or more separate words, and wherein the words comprise the two or more separate words.

7. The method of claim 1, wherein the entity knowledge base comprises a set of entities that have respective previously trained feature models, wherein the entity knowledge base dynamically assimilates a discovered entity into the set of the entities without retraining the respective previously trained feature models, and wherein a feature model is trained for the discovered entity.

8. The method of claim 1, further comprising:
training respective feature models for entities in the entity knowledge base, wherein at least a subset of the respective feature models are employed to select the subset of the features from the document feature representation and determine the disambiguated result for the mention of the ambiguous entity based upon the subset of the features, wherein training a particular feature model for a particular entity comprises:
for each feature in an entity feature representation for the particular entity, computing a smoothed probability of the feature being in the entity feature representation of the particular entity.

9. The method of claim 8, wherein the smoothed probability is computed as a function of at least one of a maximum likelihood estimation or a feature frequency specified by a language model.

10. The method of claim 1, further comprising training a statistical model for the unknown entity based upon a probability that the unknown entity comprises a set of features in an entity feature representation of the unknown entity, wherein the unknown entity is outside the entity knowledge base, and wherein the statistical model is employed to select the subset of the features from the document feature representation and determine the disambiguated result for the mention of the ambiguous entity based upon the subset of the features.

11. The method of claim 1, further comprising:
based upon the disambiguated result as determined, retrieving information from the entity knowledge base related to the disambiguated result; and
outputting the information from the entity knowledge base related to the disambiguated result.

12. The method of claim 1, further comprising augmenting the entity knowledge base with information related to the disambiguated result, wherein the information is from the document.

13. The method of claim 1, further comprising positioning the document in a ranked list as a function of the disambiguated result, wherein the rank list is returned responsive to execution of a search query.

14. A system that disambiguates a mention of an ambiguous entity, comprising:
at least one processor; and
memory that comprises computer-executable instructions that, when executed by the at least one processor, cause the at least one processor to perform acts including:
receiving a document that comprises the mention of the ambiguous entity;
identifying a set of candidate entities from an entity knowledge base from which to disambiguate the mention of the ambiguous entity;
retrieving the set of the candidate entities from the entity knowledge base, wherein each of the candidate entities has a respective entity feature representation;
forming a document feature representation based upon features of the document and the respective entity feature representations of the candidate entities, the document feature representation being formed to comprise features that are part of both:
the features of the document; and
a union set of features from the entity feature representations of the candidate entities;
selecting a subset of features from the document feature representation by employing a posterior probability pursuit algorithm; and
determining a disambiguated result for the mention of the ambiguous entity based upon the subset of the features by employing the posterior probability pursuit algorithm, wherein the disambiguated result is one of:
an unknown entity; or
one of the candidate entities.

15. The system of claim 14, wherein the subset of the features from the document feature representation are selected based upon how discriminative the features from the document feature representation are for disambiguating the mention of the ambiguous entity.

16. The system of claim 14, wherein selecting the subset of the features from the document feature representation by employing the posterior probability pursuit algorithm further comprises iteratively performing acts including:
identifying a feature from the document feature representation that maximizes a posterior probability, wherein the feature is identified from remaining features of the document feature representation; and
adding the feature to the subset of the features from the document feature representation.

17. The system of claim 14, wherein determining the disambiguated result for the mention of the ambiguous entity based upon the subset of the features by employing the posterior probability pursuit algorithm further comprises performing acts including:
computing, based upon the subset of the features, respective posterior probabilities for the candidate entities and the unknown entity; and
identifying the disambiguated result, wherein the disambiguated result corresponds to a maximum posterior probability from the respective posterior probabilities.

18. The system of claim 14, the memory further comprising computer-executable instructions that, when executed by the at least one processor, cause the at least one processor to perform acts including:
training respective feature models for entities in the entity knowledge base, wherein at least a subset of the respective feature models are employed to select a subset of features from the document feature representation and determine a disambiguated result for the mention of the ambiguous entity based upon the subset of the features.

19. The system of claim 14, the memory further comprising computer-executable instructions that, when executed by the at least one processor, cause the at least one processor to perform acts including:
training a statistical model for the unknown entity based upon a probability that the unknown entity comprises a set of features in an entity feature representation of the unknown entity, wherein unknown entity is outside the entity knowledge, and wherein the statistical model is employed to select the subset of the features from the document feature representation and determine the disambiguated result for the mention of the ambiguous entity based upon the subset of the features.

20. A method of disambiguating a mention of an ambiguous entity, comprising:
receiving a document that comprises the mention of the ambiguous entity;
retrieving a set of candidate entities from an entity knowledge base based upon the mention of the ambiguous entity, wherein each of the candidate entities has a respective entity feature representation;
generating a document feature representation based upon features of the document and the respective entity feature representations of the candidate entities, wherein features from the document feature representation comprise words and phrases;
while conditions remain unsatisfied, iteratively:
identifying a feature from the document feature representation that maximizes a posterior probability, wherein the feature is identified from remaining features of the document feature representation; and
adding the feature to a subset of the features from the document feature representation;
responsive to at least one of the conditions being satisfied:
computing, based upon the subset of the features, respective posterior probabilities for the candidate entities and an unknown entity; and
identifying a disambiguated result for the mention of the ambiguous entity, wherein the disambiguated result corresponds to a maximum posterior probability from the respective posterior probabilities, wherein the disambiguated result is one of:
an unknown entity; or
one of the candidate entities.

* * * * *